(12) United States Patent
Beyda

(10) Patent No.: US 8,184,614 B2
(45) Date of Patent: May 22, 2012

(54) SYSTEM AND METHOD FOR AUTOMATIC VOICE OVER IP ENDPOINT CONFIGURATION

(75) Inventor: William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1422 days.

(21) Appl. No.: 10/136,149

(22) Filed: May 1, 2002

(65) Prior Publication Data

US 2003/0206546 A1    Nov. 6, 2003

(51) Int. Cl.
*H04L 12/66* (2006.01)
(52) U.S. Cl. .......................... 370/352; 370/401
(58) Field of Classification Search .................. 370/352, 370/353, 354, 355, 356, 401
See application file for complete search history.

(56) References Cited

U.S. PATENT DOCUMENTS

| | | | |
|---|---|---|---|
| 5,259,017 A * | 11/1993 | Langmantel | 455/555 |
| 5,596,723 A | 1/1997 | Romohr | |
| 5,912,897 A * | 6/1999 | Steinbach | 370/467 |
| 5,974,447 A * | 10/1999 | Cannon et al. | 709/206 |
| 5,995,607 A * | 11/1999 | Beyda et al. | 379/202.01 |
| 6,029,196 A | 2/2000 | Lenz | |
| 6,272,536 B1 | 8/2001 | van Hoff et al. | |
| 6,370,141 B1 * | 4/2002 | Giordano et al. | 370/386 |
| 6,466,937 B1 * | 10/2002 | Fascenda | 707/10 |
| 6,560,604 B1 * | 5/2003 | Fascenda | 1/1 |
| 6,687,354 B1 * | 2/2004 | Andreason | 379/198 |
| 6,744,759 B1 * | 6/2004 | Sidhu et al. | 370/356 |
| 6,748,195 B1 * | 6/2004 | Phillips | 455/41.2 |
| 6,754,224 B1 * | 6/2004 | Murphy | 370/432 |
| 6,810,421 B1 * | 10/2004 | Ishizaki et al. | 709/226 |
| 6,856,616 B1 * | 2/2005 | Schuster et al. | 370/352 |
| 6,952,428 B1 * | 10/2005 | Necka et al. | 370/466 |
| 7,065,070 B1 * | 6/2006 | Chang | 370/352 |
| 7,171,475 B2 * | 1/2007 | Weisman et al. | 709/227 |
| 7,177,869 B2 * | 2/2007 | Yoshimura et al. | 1/1 |

FOREIGN PATENT DOCUMENTS

WO    WO 01/69888 A1    9/2001

OTHER PUBLICATIONS

Pagurek, Tang, White, Glitho; Management of Advanced Services in H.323 Internet Protocol Telephony; IEEE Infocom 2000; pp. 91-100.

* cited by examiner

*Primary Examiner* — Ricky Ngo
*Assistant Examiner* — Christine Ng
(74) *Attorney, Agent, or Firm* — Buchanan Ingersoll & Rooney PC

(57) ABSTRACT

A telecommunications system includes a packet network; a plurality of VoIP endpoints; and a plurality of VoIP feature servers. The VoIP endpoints are able to send configuration request messages to the feature servers. The feature servers respond with information indicative of supported features. The VoIP endpoints can then update the system configurations based on the response information. Further, newly added feature servers transmit feature availability messages to endpoints when initially installed. The endpoints then respond to configure themselves appropriately.

17 Claims, 3 Drawing Sheets

SYSTEM AND METHOD FOR AUTOMATIC VOICE OVER IP ENDPOINT CONFIGURATION

BACKGROUND OF THE INVENTION

The present invention relates to telecommunications devices and, in particular, to an improved system and method for voice-over-IP endpoint configuration.

Internet Protocol (IP) networks such as local area networks (LAN) are increasingly replacing private branch exchange (PBX) based networks and are becoming increasingly popular for providing voice and multimedia services. In particular, systems based on the ITU Recommendation H.323 are coming into increasing use. In such systems, Internet Protocol telephony devices or endpoints, such as telephones and telephone soft-clients residing on personal computers attached to a network, must be configured to register with a gateways, gatekeepers, and a plurality of feature servers, such as multipoint conference units (MCU), in order to enable certain network functions. Other feature servers also may exist to provide features not available to the particular endpoint, but the endpoint must nonetheless know of the presence of these servers to function properly.

The migration from PBX-based systems to LAN-based systems is not occurring immediately. There are users who employ "telephony feature access" (TFA) devices to couple personal computers to the LAN, and then obtain their telephony services from a PBX that is also coupled to the LAN, by way of a TFA server. Such TFA devices must also be registered to their respective servers.

While some aspects of the endpoints' functionality have been configurable automatically, registration of the IP telephony devices and TFA devices with all servers and activation of features is typically largely manual. Further, while the Dynamic Host Configuration Protocol (DHCP) provides for automatic setting of the endpoints' session IP addresses, the DHCP does not provide for feature configuration.

As such, there is a need for an improved system for registering newly-added telephony devices to a Voice-over-IP (VoIP) multimedia system.

SUMMARY OF THE INVENTION

These and other problems in the prior art are overcome in large part by a system and method according to the present invention.

A telecommunications method according to an embodiment of the present invention includes transmitting a VoIP configuration request message from a VoIP endpoint over an IP network to one or more VoIP feature servers; receiving at the VoIP endpoint in response to the VoIP configuration request message feature support messages from the one or more VoIP feature servers, the feature support messages identifying supported features; and configuring the VoIP endpoint responsive to the feature support messages.

A telecommunications system according to an embodiment of the present invention includes a packet network; a plurality of VoIP endpoints; and a plurality of VoIP feature servers. The VoIP endpoints are able to send configuration request messages to the feature servers. The feature servers respond with information indicative of supported features. The VoIP endpoints can then update the system configurations based on the response information. Further, newly added feature servers transmit feature availability messages to endpoints when initially installed. The endpoints then respond to configure themselves appropriately.

A better understanding of the invention is obtained when the following detailed description is considered in conjunction with the following drawings.

DETAILED DESCRIPTION OF THE INVENTION

Figure 1:
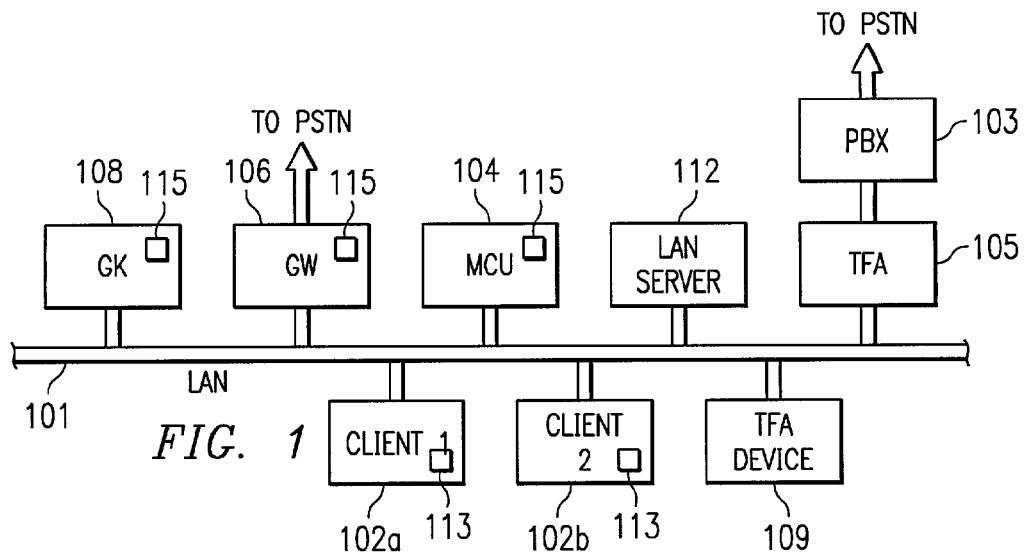
FIG. 1 is a block diagram of an exemplary telecommunications system according to an embodiment of the present invention.

Turning now to the drawings, and with particular attention to FIG. 1, a diagram illustrating an exemplary H.323 telecommunications system according to an embodiment of the present invention is shown. It is noted that, while described herein with regard to an H.323 network according to a specific embodiment, the invention is equally applicable in other specific embodiments to any network in which separate media and signaling channels are used, such as MGCP (Media Gateway Control Protocol), SIP+ (Inter MGS Protocol), SGCP, MEGACO, and generally, any voice or multimedia over IP scheme. Further, it is noted that, while described specifically in the context of voice packets, the present invention encompasses the use of any multimedia information, such as video, data, voice, or any combinations thereof. Finally, it is noted that an exemplary generic H.323 system is the HiPath 5000 system, available from Siemens.

The telecommunications system includes a local area network (LAN) or packet network 101. Coupled to the LAN 101 may be a variety of H.323 terminals 102a, 102b, and feature servers, such as a multi-point control unit (MCU) 104, an H.323 gateway 106, an H.323 gatekeeper 108, a LAN server 112, and a plurality of other devices such as personal computers (not shown). The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission and Status (RAS), and RTP/RTCP for sequencing audio and video packets. The H.323 terminals 102a, 102b may further implement audio and video codecs, T.120 data conferencing protocols, and MCU capabilities. Further details concerning the H.323 Recommendation may be obtained from the International Telecommunications Union; the H.323 Recommendation is hereby incorporated by reference in its entirety as if fully set forth herein.

Further, the H.323 terminals 102a, 102b include control units having configuration control units 113, according to the present invention. As will be explained in greater detail below, the configuration control units 113 function to send configuration request messages to the feature servers, requesting configuration information and options. The feature servers 104, 106, 108 themselves include configuration controllers 115 which are used to receive the configuration requests from the H.323 terminals and provide the configuration responses. In addition, the configuration controllers 115 allow the feature servers to announce their presence to the H.323 terminals when attached to the network.

Also coupled to the LAN 101 may be a feature server known as a telephony feature access server 105 which couples the LAN 101 to a PBX 107. An exemplary telephony feature access server is the Hicom Feature Access server, available from Siemens, and employing the Cornet protocol. Thus, one or more TFA devices 109 may also be coupled to the LAN 101.

Figure 2:
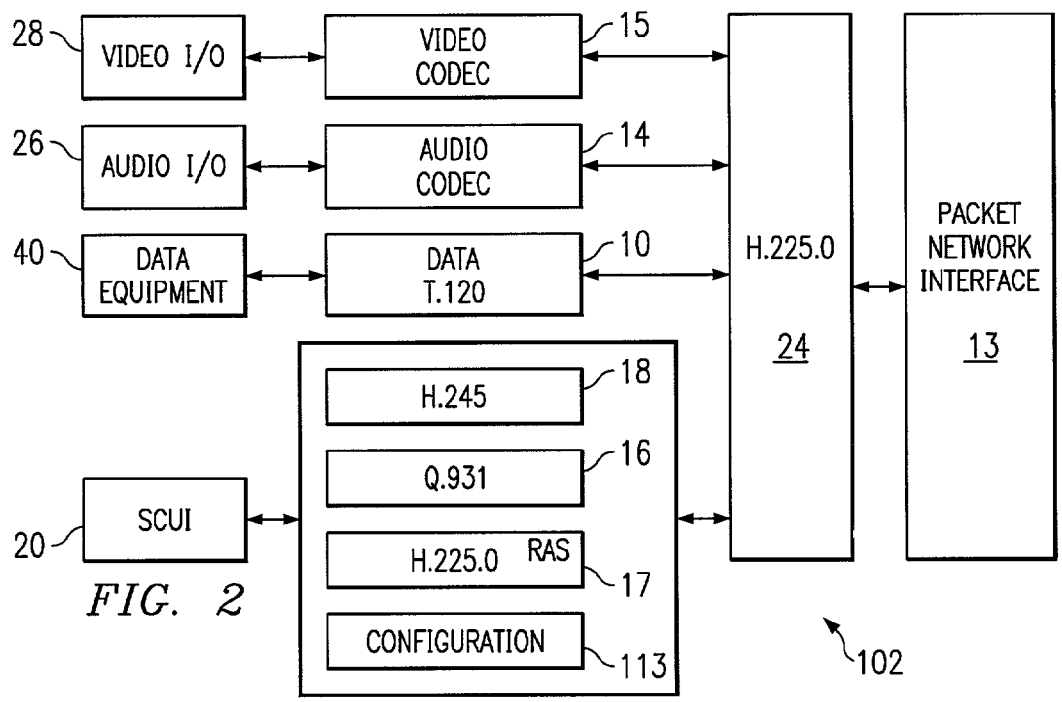
FIG. 2 is a block diagram of an exemplary Voice-over-IP terminal according to an embodiment of the present invention.

In accordance with a specific embodiment of the present invention, FIG. 2 illustrates a logical diagram of an H.323 interface, typically present in the endpoints 102a, 102b, to the LAN 101. The interface which may be present in a network terminal 102 includes a configuration unit 113 according to the present invention and a packet network interface 13. As will be discussed in greater detail below, the network terminal 102 utilizes the ITU-T H.323 Recommendation protocol. The network interface 13 couples the network terminal 102 to the LAN 101. H.323 terminals/devices and equipment carry real-time voice, video and/or data. It should be noted that H.323 recommendation is an umbrella recommendation that provides for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The H.323 terminal interface 10 is coupled to a video input/output (I/O) interface 28, an audio I/O interface 26, a data equipment interface 40, and a system control user interface (SCUI) 20. The network terminal 102 further includes an H.225.0 layer 24, an audio coder/decoder (codec) 14 (e.g., implementing G.711, G.728, G.729, G.723.1, G.722), and may include a video codec 15 (e.g., implementing H.261, H.263), and a T.120 data interface layer 10. The audio I/O interface or card 26, which may be part of the standard H.323 device, connects to the audio codec 14, such as a G.711 codec, for encoding and decoding audio signals. The audio codec 14 is coupled to the H.225.0 layer 24. It encodes audio signals for transmission and decodes received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes received signals. H.261 is the mandatory codec for H.323 terminals that support video, though other video codecs such as H.263 may be supported.

The system control user interface (SCUI) 20 provides signaling and flow control for proper operation of the H.323 terminal 102. In particular, call signaling and control are handled by the SCUI 20. The control layer includes a configuration control unit 113 according to the present invention, but otherwise may be a standard H.323 control layer and thus includes a Q.931 layer 16, H.225.0 RAS layer 17, and H.245 layer 18. Thus, the SCUI 20 interfaces to the H.245 layer 18 which is the media control protocol that allows capability exchange, opening and closing of logical channels, mode preference requests, flow control messages and other miscellaneous commands and indications. The SCUI 20 also interfaces to the Q.931 protocol 16 which defines the setup, teardown, and control of H.323 communication sessions. The SCUI 20 further interfaces to the H.225.0 Registration, Admission and Status (RAS) protocol 17 that defines how H.323 entities can access H.323 gatekeepers to perform, among other things, address translation, thereby allowing H.323 endpoints to locate other H.323 endpoints via an H.323 gatekeeper. The H.225.0 layer 24, which is derived from Q.931 layer 16, is the protocol for establishing a connection among two or more terminals and also formats the transmitted video, audio, data, signaling and control streams into messages for communication via the network interface 13 (e.g., packet network 101). The H.225.0 layer 24 also retrieves the received video, audio, data, signaling and control streams from messages that have been input from the network interface, routes the signaling and control information to the control layer and routes media streams to the appropriate audio, video and data interfaces.

As noted above, a configuration control unit 113 according to embodiments of the present invention is adapted to issue configuration requests to coupled feature servers. More particularly, the configuration unit 113 is adapted to issue a VoIP Configuration Request message, typically in a multicast format, to the feature servers on the network. The configuration unit 113 receives configuration information back from the feature servers' corresponding configuration units and accordingly updates its system settings.

Figure 3:
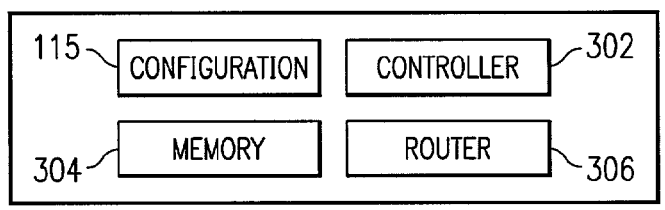
FIG. 3 is a block diagram of an exemplary feature server according to an embodiment of the present invention.

FIG. 3 is a block diagram illustrating an exemplary feature server according to an embodiment of the present invention. The feature server shown is exemplary of the gateway, gatekeeper, MCU or TFA server of FIG. 1. The feature server of FIG. 3 includes a controller 302, a router 306, and a memory 304. In addition, the feature server includes a configuration unit 115 according to embodiments of the present invention. Such a configuration unit 115 may be implemented as software executable by the controller 302 and making use of memory 304. The configuration unit 115 is able to receive configuration requests from the endpoints and to provide the desired configuration information. In addition, in certain embodiments, the configuration unit 115 sends a configuration presence message to attached endpoints when the feature server is attached to the network. The memory 304 may be used to store, for example, tables of attachable devices and their configurable settings, as well as the configured settings of the server and attached devices, as will be explained in greater detail below.

Figure 4:
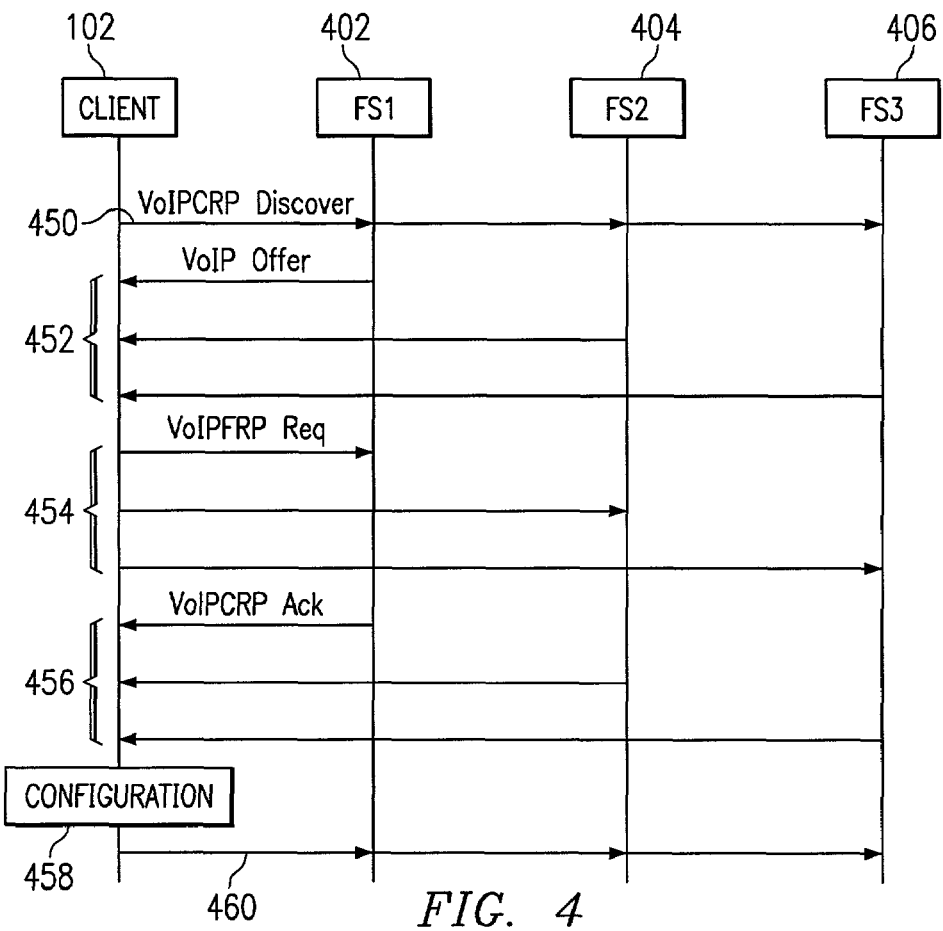
FIG. 4 is a flow diagram illustrating signaling for an embodiment of the present invention.

FIG. 4 is a flow diagram illustrating signaling for an embodiment of the present invention. Shown are an exemplary endpoint 102 (or 109), and a plurality of feature servers 402, 404, 406.

Figure 6:
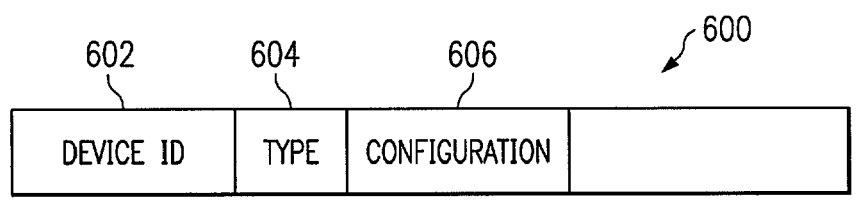
FIG. 6 illustrates an exemplary configuration request message according to an embodiment of the present invention.

Initially, (i.e., after the endpoint has obtained an IP address), at 450, the endpoint 102 issues a VoIP Configuration Discover message to the feature servers 402, 404, 406. Typically, the message is sent in a multicast fashion, using an IP multicast protocol. FIG. 6 illustrates an exemplary Configuration Discover message. The message 600 includes, for example, a device ID field 602 to identify the device issuing the request; a device type field 604 to identify the type of device making the request; and a configuration request field 606, to let the recipients know that the message is a configuration request.

In 452, the various feature servers 402, 404, 406 respond with Configuration Offer messages. Essentially, the feature servers 402, 404, 406 read the Configuration Discover message(s) and return the Configuration Offer message with their identification and features they provide, as well as necessary configurations required of the endpoint. It is noted that, in certain embodiments, the Configuration Offer message may include only an identification of the type of server returning the message; in this case, the endpoint will then access a memory for the server type and the configuration information necessary. In 454, the endpoint responds with a Configuration Request message to the feature servers. The Configuration Request message identifies the features that are desired to be implemented by the endpoint, and the server that is to do the implementing. In 456, the feature servers 402, 404, 406 respond with Configuration Acknowledge messages. The Configuration Acknowledge messages simply acknowledge the services they will be providing, and that the endpoint 102 will be configuring itself to accept them. In 458, the endpoint 102 adjusts internal settings in accordance with the appropriate configuration. Finally, in 460, the endpoint 102 may make use of the services provided by the feature servers 402, 404, 406.

Figure 5A:
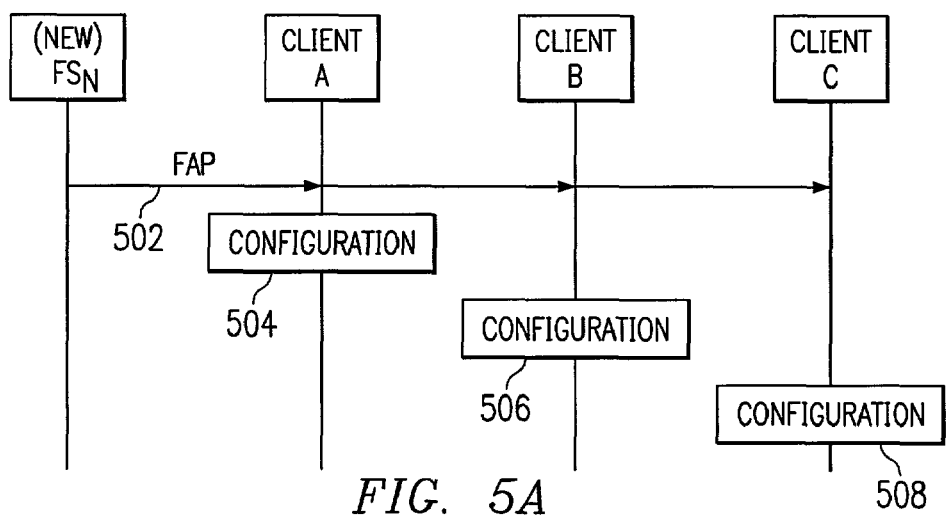
FIG. 5A and FIG. 5B illustrate feature server presence announcement according to an embodiment of the present invention.
Figure 5B:
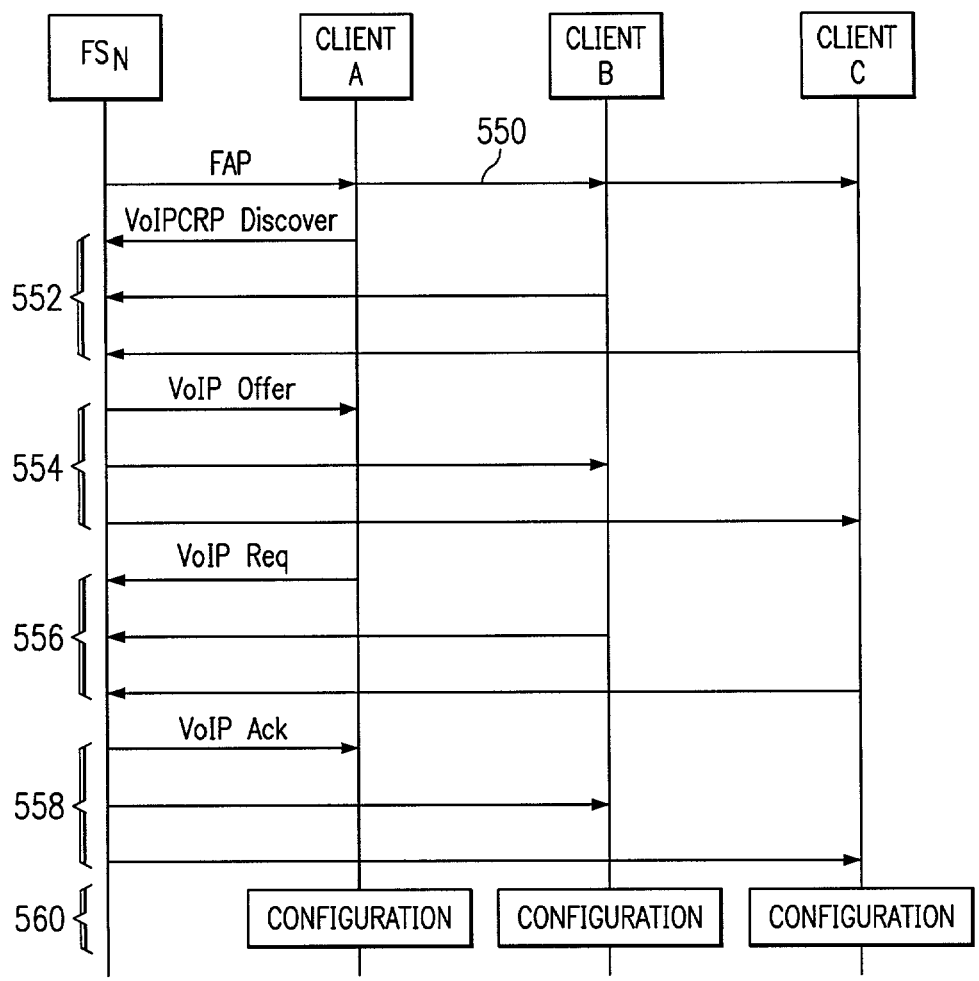
Figure 7:
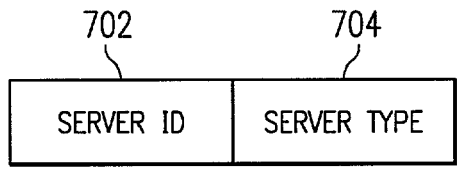
FIG. 7 illustrates an exemplary Feature Availability message according to an embodiment of the present invention.

FIG. 5A and FIG. 5B illustrate system operation when a new feature server is added to the network. Shown in FIG. 5A are a feature server FSN, a Client A, a Client B, and a Client C. Upon the feature server FSN being added to the network, at 502, it issues a Feature Availability packet to the client endpoints Client A, Client B, Client C. Typically, the message is issued as an IP multicast message. In this embodiment, the Feature Availability message has a format as shown in FIG. 7. Thus, it includes a server ID 702 and a server type field 704. The client endpoints Client A, Client B, and Client C, receive and read their respective Configuration Availability messages, access their configuration memories (not shown) and perform their respective configurations 504, 506, 508.

Thus, in the embodiment illustrated, the endpoints themselves carry memories with the configuration information. In other embodiments, however, the actual configuration information is transmitted from the server.

For example, shown in FIG. 5B are a feature server FSN, and endpoints Client A, Client B, and Client C. At 550, the newly-added feature server FSN sends the feature availability message, again, typically in an IP multicast format. It may generally have the form seen in FIG. 7, although in other embodiments, instead of accessing an on-board memory for the configuration information, the actual configuration information may be provided. Because this might unduly burden system bandwidth, in the embodiment illustrated, only interested clients respond. As shown, the Clients A, B, and C respond with Configuration Discover messages, at 552. Unlike the embodiment discussed in FIG. 4, these may be unicast, though multicast is also possible. From this point, the signal flow is generally similar to that of FIG. 4. At 554, the feature server FSN responds with a Configuration Offer message, including the configuration information, for example. At 556, the client endpoints send the Configuration Request messages to identify the requested features. At 558, the feature server FSN responds with the Acknowledge message. Finally, at 560, the endpoints update their configurations.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising:
transmitting a VoIP configuration discover message from a VoIP endpoint to multiple VoIP feature servers to identify features provided, wherein at least one of said VoIP feature servers comprises a telephony feature access server interfacing a private branch exchange to an IP network;
receiving at said VoIP endpoint, in response to said VoIP configuration discover message, a configuration offer message from the VoIP feature servers, said configuration offer message identifying features supported by a responding VoIP feature server;
transmitting a VoIP configuration request message from the VoIP endpoint over said IP network to one or more VoIP feature servers, the VoIP configuration request message indentifying features desired to be implemented at the VoIP endpoint;
receiving at said VoIP endpoint, in a response to said VoIP configuration request message, from said VoIP feature servers, said configuration acknowledge message acknowledging features to be provided by the responding VoIP feature server;
accessing a memory by the VoIP endpoint for configuration information corresponding to the supported features responsive to the configuration offer message, wherein the configuration information is not included in the configuration offer message;
configuring said VoIP endpoint responsive to said configuration acknowledge message with the configuration information from the memory; and
transmitting a feature availability protocol packet message by a newly-added feature server directly to the VoIP endpoint without being requested by the VoIP endpoint, wherein the feature availability protocol packet message indicates feature availability of the newly-added feature server.

2. The telecommunications method in accordance with claim 1, wherein said transmitting the VoIP configuration discover message from the VoIP endpoint comprises transmitting according to an IP multicast protocol.

3. The telecommunications method in accordance with claim 2, wherein the configuration acknowledge message comprises information regarding supported features.

4. The telecommunications method in accordance with claim 3, wherein said feature availability protocol packet message is transmitted in a multicast format.

5. A telecommunications system, comprising:
a packet network;
a plurality of VoIP endpoints coupled to said network;
a plurality of VoIP feature servers coupled to said network, wherein at least one of said VoIP feature servers comprises a telephony feature access server interfacing a private branch exchange to said network;
wherein said VoIP endpoints are adapted to send configuration request messages to said feature servers after having received a configuration offer message in response to a configuration discover message, the configuration request message identifying features desired to be implemented at the VoIP endpoints and the configuration offer message identifying features supported by a responding feature server; and
wherein the VoIP endpoints are configured to access memories for configuration information responsive to the configuration offer message indicative of features and configure themselves according to the configuration information, wherein the configuration information is not included in the configuration offer message;
wherein a newly-added VoIP feature server is adapted to issue a feature availability message directly to the VoIP endpoints on said network without being requested by the endpoints, wherein the feature availability message indicates feature availability of the newly-added VoIP feature server.

6. The telecommunications system in accordance with claim 5, wherein said configuration request messages are sent in an IP multicast format.

7. The telecommunications system in accordance with claim 6, wherein said VoIP endpoints are adapted to implement configuration options responsive to said configuration information.

8. The telecommunications system in accordance with claim 7, wherein the feature availability message is issued in an IP multicast format.

9. The telecommunication system in accordance with claim 8, wherein said VoIP endpoints respond to said feature availability message with unicast configuration discover messages.

10. The telecommunications system in accordance with claim 5, wherein said VoIP endpoints respond to said feature availability message with unicast configuration discover messages.

11. The telecommunications system in accordance with claim 5, wherein said private branch exchange is a Hicom private branch exchange.

12. The telecommunications system in accordance with claim 11, wherein said feature server translates to and from protocols used by a VoIP system and Siemens Cornet protocol.

13. A telecommunications device, comprising:
an IP interface;
means for sending an IP configuration discover message to multiple feature servers to identify features supported; and
means for receiving, responsive to the IP configuration discover message, a configuration offer message from the feature servers, said configuration offer message identifying features supported by a responding feature server;
means for sending an IP configuration request to one or more feature servers, the IP configuration request message identifying features desired to be implemented at the telecommunications device;
means for receiving a configuration acknowledgement message responsive to said IP configuration request, said configuration acknowledgement message identifying features to be provided by said responding feature server;
means for accessing a memory for configuration information not included in the configuration offer message and configuring said device in accordance with said configuration information; and
means for receiving a feature availability information message directly from a newly-added feature server which is transmitted without being requested by the telecommunications device, wherein the feature availability information message indicates feature availability of the newly-added feature server.

14. The telecommunications device in accordance with claim 13, wherein said sending means comprises a multicast IP sending means.

15. The telecommunications device in accordance with claim 14, wherein said sending means comprises a unicast IP sending means.

16. The telecommunications device in accordance with claim 14, wherein said sending means further includes means for responding to said feature availability information.

17. A telecommunications method, comprising:
attaching an IP multimedia feature server to an IP network, the network including a plurality of IP endpoints;
sending a multicast message to said IP endpoints by the IP multimedia feature server when attached to the IP network without being requested by the IP endpoints, wherein the multicast message indicates available features of said feature server;
retrieving configuration information from configuration memories in the IP endpoints, wherein the configuration information is not included in the multicast message; and
updating said IP endpoints with the configuration information to accommodate said feature server responsive to a configuration request from said IP endpoints, the configuration request identifying features desired to be implemented at the IP endpoints, and after receiving an indication at said IP endpoints of features supported by a corresponding IP multimedia feature server.

* * * * *